June 19, 1934.  E. H. CROSSEN  1,963,613
SUPERCHARGING ORGANIZATION FOR INTERNAL COMBUSTION ENGINES
Filed Feb. 23, 1933   2 Sheets-Sheet 1

Inventor
Edgar H. Crossen
By Edward R. Inman
Attorney

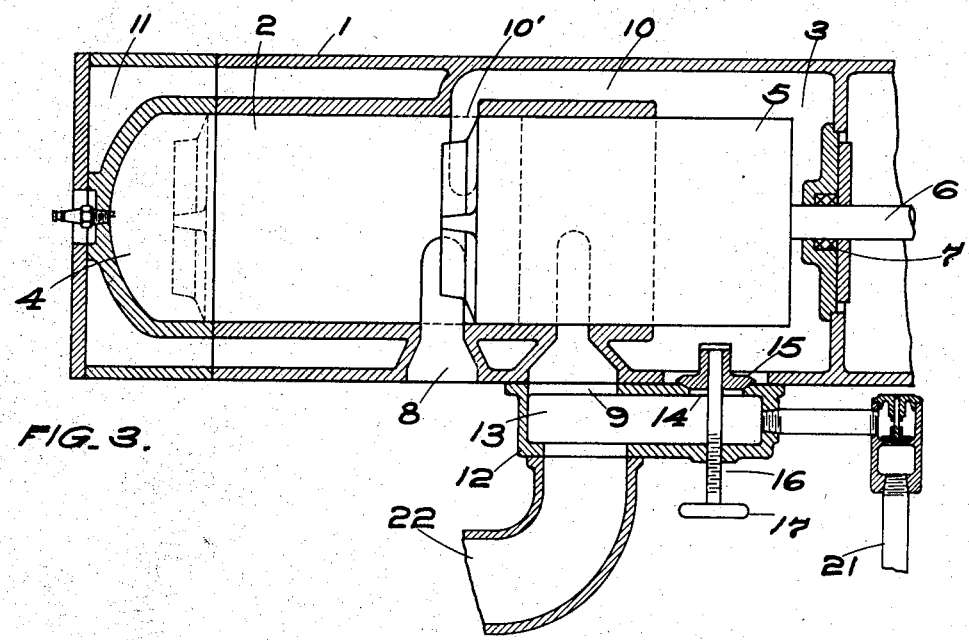
FIG_3.
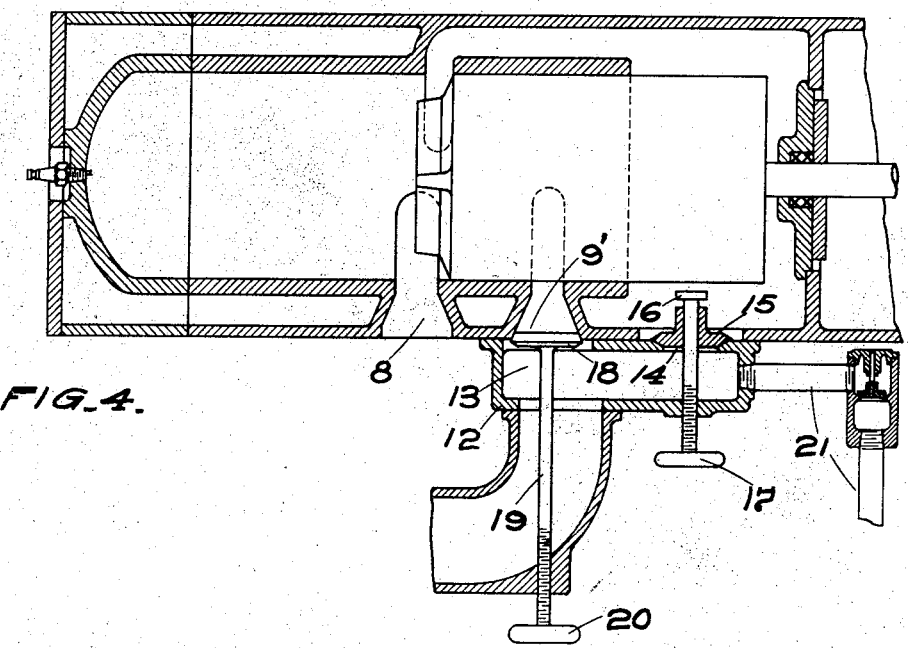
FIG_4.
Inventor
Edgar H. Crossen
By Edward R. Inman
Attorney Patented June 19, 1934

1,963,613

UNITED STATES PATENT OFFICE 1,963,613

SUPERCHARGING ORGANIZATION FOR INTERNAL COMBUSTION ENGINES

Edgar H. Crossen, Franklin, Pa., assignor to Franklin Valveless Engine Company, Franklin, Pa., a corporation of Pennsylvania Application February 23, 1933, Serial No. 658,018

5 Claims. (Cl. 123—74)

To those skilled in the design, construction and operation of an internal combustion engine it is a well known fact that, in order to attain a maximum efficiency of operation and fuel consumption, the scavenging of the products from the combustion chamber of the cylinder should be complete, so that there remains in said chamber none of the products of combustion at the instant when the new charge has entered and the compression stroke of the piston is about to begin.

However, such a complete elimination of products of combustion has seldom been attained, since its attainment is dependent upon filling the combustion chamber to atmospheric pressure, or slightly thereabove with a new charge, of either air or fuel mixture as the case may be. In the operation of internal combustion engines as practiced today, it is commonly understood that the volume of charge which is taken into the cylinder is equal at atmospheric pressure to the volume of the cylinder which is swept by the rear, or combustion face of the piston; in a valveless, three-port, two cycle engine it means a volume of charge equal to the displacement of the piston in the pump chamber, which is also equal to the displacement of the piston in the combustion chamber; but in addition to this amount of space there is, in the combustion chamber, an additional space termed the compression space; consequently the volume of charge which is delivered from the pump chamber to the combustion chamber should be fully equal to or slightly above the whole volume of the combustion chamber at atmospheric pressure, thus providing for the escape of a small fraction of the charge from the exhaust port before it is fully closed and still leave a full charge in the combustion chamber for power production.

It is, therefore, the object of this invention to provide a supercharging organization which will, by its operation, cause the delivery into the combustion chamber of an internal combustion engine, a charge of air or fuel, as the case may be, at or slightly above atmospheric pressure.

It is a further object of this invention to provide an organization for the purpose set forth, that is of such simplicity and facility of incorporation that the same may be easily and quickly applied to nearly all types of internal combustion engines.

Still another object is the attainment of convertibility at will, from a three-port, valveless to a valved engine and the reverse as economy of operation or other circumstances may require.

One form of organization whereby I am enabled to attain said objects is clearly illustrated in the accompanying drawings, which show a well known type of three-port valveless, two-cycle engine having my improved supercharging and converting organization applied thereto.

Referring to said drawings:

Fig. 1 is a central, longitudinal section through the cylinder of the engine, and indicates that the piston has just started upon its compression stroke into the combustion chamber, and its suction stroke in relation to the pump chamber, the direction of movement of the piston being indicated by the arrow; throughout this movement the supercharging valve is open to permit the flow of combustion supporting air into the pump chamber, whereby the supercharging function is performed.

Fig. 3 is a central, longitudinal section through the cylinder of the engine showing my supercharging valve in its closed, locked and inoperative position, in which the engine operates solely as a valveless engine.

Fig. 4 is a central, longitudinal section through the cylinder of the engine showing a converting valve, whereby in coordination with my supercharging valve, the engine may be converted at will into a valve engine.

Figure 1:
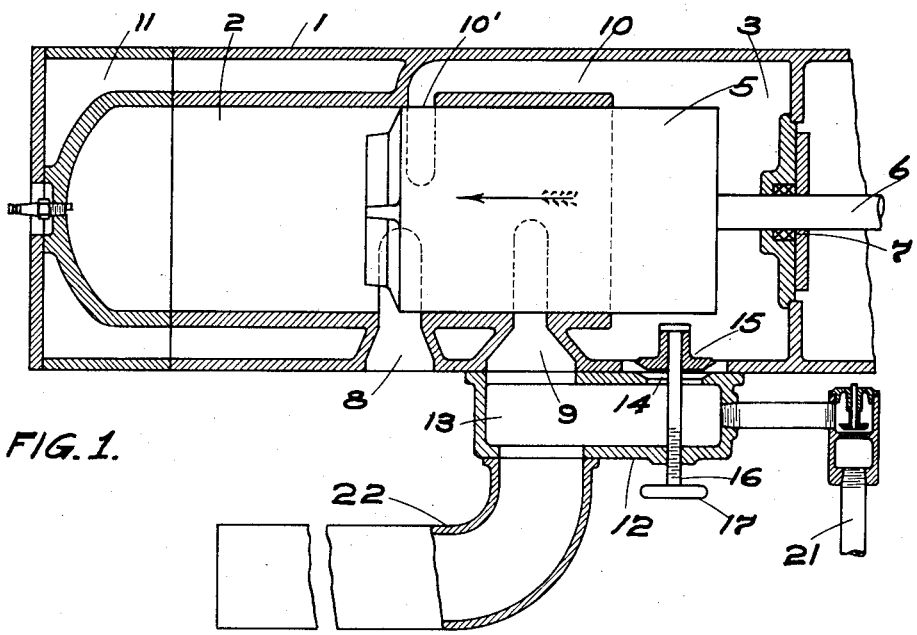

The construction shown in the drawings is substantially as follows:

The cylinder of the engine is indicated by the numeral 1; the combustion chamber is indicated by the numeral 2; 3 is the pump chamber of said cylinder; 4 is the compression space of the combustion chamber; 5 is the piston of the engine; 6 is the piston rod which operates through a stuffing box 7; 8 is the exhaust port leading from the combustion chamber to the atmosphere, and it is piston controlled; 9 is a normally piston controlled air or fuel inlet port through which air or fuel charge is supplied to said pump chamber 3, as said port is uncovered by the forward edge of piston 5; 10 is a transfer passage through which the charge in pump chamber is transferred to the combustion chamber as port 10' is uncovered by the rearward edge of the piston. The combustion end of the cylinder is shown as being enveloped by the usual water-jacket 11.

So far as the description in the immediately preceding paragraph is concerned, it sets forth a well known, so called valveless, three-port, two-stroke cycle, internal combustion engine.

My improved supercharging organization comprises an air-chamber casing 12, which may be either formed integrally with, or attached in any suitable manner to the outer wall of the engine cylinder; said casing forms a chamber 13 from which a port 9 affords piston controlled communication with pump chamber 3. A port 14 also affords communication between chamber 13 and said pump chamber; said port 14 is provided with a manually adjustable valve 15 of the check valve type which is provided with a screw threaded stem 16 that extends through a cooperating screw threaded hole in the wall of casing 12; a hand wheel 17 for manual operation is mounted upon the projecting end of said stem, whereby said valve may be actuated at will to its open or closed positions, and also be retained in it closed position.

A converting valve 18 is provided for the purpose of closing port 9'; this valve is also provided with a screw threaded stem 19 which passes through a cooperating screw threaded hole in the wall of air pipe 22, and upon the projecting end of said stem is operatively mounted a hand wheel 20, operable at will for the manual actuation of said valve into either its open position, or to its closing position in port 9', as and for the purposes to be presently set forth. Said valve 15, being of the check valve type, is adapted, when in its operative position, to have longitudinal movement upon its stem 16, and is thus automatically operative to prevent regurgitation.

A fuel pipe 21 is shown as leading into said chamber 13 whereby fuel gas may be supplied thereto; an air supply pipe also leads into said chamber 13, and this pipe constitutes an important factor in my improved supercharging organization.

The mode of operation of my improved supercharging and converting organization is as follows: By reference to Fig. 1 of the drawings it will be noted that the piston 5 has moved sufficiently in the direction of its compression stroke as indicated by the arrow,—that is, its suction stroke as related to the pump chamber 3—to have caused the opening of valve 15, and through this valve a continuous flow of air or fuel charge takes place throughout the suction stroke of the piston in the pump chamber; air will also flow into said pump chamber through port 9 when said port is uncovered by the piston.

Pipe 22 is so proportioned with reference to diameter and length as to cause the air to flow therethrough into chamber 13 at a speed of travel of approximately 2400 feet per minute.

This velocity of travel of air in pipe 22 produces such a supercharging pressure in chamber 13 and the pump chamber 5 as to fill them with a charge at a pressure sufficiently above normal,—that is atmospheric pressure—, that when it is transferred to the combustion chamber 2 its volume at atmospheric pressure is not only sufficient to completely fill the combustion chamber, but sufficient, moreover, to cause a slight percentage of it to pass out of the exhaust port 8, thus effectually scavenging the combustion chamber; this action will also be conducive to an increase of power of the engine to the extent of approximately twenty-eight percent; it will also, especially if the engine is an oil engine, be conducive to economy of fuel consumption.

Referring to Fig. 4, the converting valve 19 there shown may be employed to close port 9 at will, whereby the engine is converted into a valve engine in which the charge of either air or fuel mixture all passes into the pump chamber through valve 15.

It has already been stated that valve 15 may be actuated into and secured at its closed position, at will by means of the hand wheel 17, thus being rendered inoperative. It will, therefore, be readily seen that my improved organization adapts the engine with which it is equipped to be operative either as a valveless engine, as indicated in Fig. 3, as a combination valved and valveless engine, as indicated in Figs. 1 and 2, or as a valved engine, as indicated in Fig. 4.

It is particularly pointed out that the conversions of the engine noted above, may be produced at will while the engine is in operation.

Figure 2:
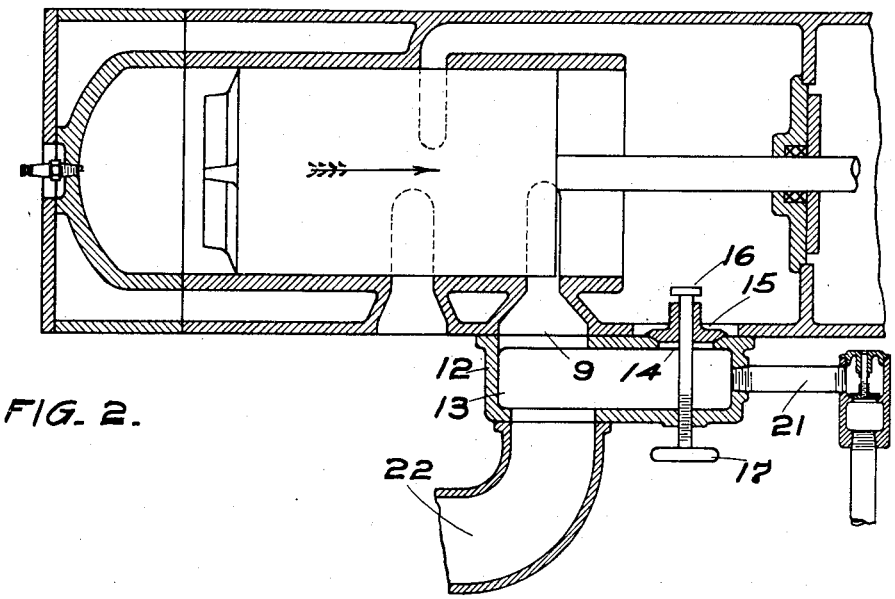
Fig. 2 is a central, longitudinal section through the cylinder of the engine with its piston at the innermost limit of its compression stroke; the supercharging valve is shown in its closed but operative position; the position of the supercharging valve here shown is maintained throughout the travel of the piston in the direction indicated by the arrow.

In respect to these three modes of operation, it is noted that the combination mode of operation indicated in Figs. 1 and 2, shows the highest degree of efficiency, owing to the greater degree of momentum and inertia which is attained by the air in pipe 22, but the mode of operation indicated in Fig. 4 approaches this very closely, and in the mode of operation shown in Fig. 3, when the supercharging valve is locked in the closed position, no supercharging takes place.

For the purpose of enabling others skilled in the art to which it relates to make and use my improved supercharging organization, without previous experimentation, the following specification is given.

Diameter of engine piston, 12 inches; length of stroke, 16 inches; revolutions per minute 180 to 225; diameter of intake pipe, 6 inches; length of intake pipe, 15 to 22 feet.

With any other size of engine the intake pipe should be so proportioned as to cause the air passing into the engine to have speed of 2400 feet per minute in order to produce an efficient supercharging effect.

Before enumerating the advantages of my improved supercharging and converting organization, it will help somewhat in their elucidation to state that the valveless, three-port, two stroke cycle type of engine possesses a number of desirable features, among which are, simplicity of construction, absence of moving valves and the consequent absence of wear and upkeep, absence of the operative noise of such valves, and comparatively low maintenance expense.

But, owing to the very short interval of time in which, and the mode of taking the charge of either fuel or air into the pump chamber of the engine, and the transference of said charge into the combustion chamber, it is difficult, if not quit impossible, to charge the engine with a fuel charge which attains atmospheric pressure in the combustion chamber; notwithstanding this disadvantage, if such an engine is judiciously selected and used, it is a very satisfactory power appliance. In a considerable number of instances where it is used, it has been found that power requirements are at times above its capacity, in which cases, as a matter of course, it falls short of being satisfactory.

Not only in such cases as this, but in all cases where a more satisfactory power appliance is desired, the power of the engine when equipped with my improved equipment may instantly, and at will be increased by approximately 28 per cent.

The power of any other type of internal combustion engine may be increased when equipped with my improved supercharging device, the main feature of which is an intake pipe so proportioned to the capacity of the engine to which it is applied, that the air when being drawn into the engine, attains a velocity of 2400 feet per minute, whereby a supercharging action is exerted by the air as it enters the engine.

If the engine is not fitted with port 9 and cannot operate as a valveless engine, then all the air must enter space 3 through the valve 15. In this case there would be some supercharging through the valve 15 but, on account of the resistance of the valve to the flow of air, the degree of supercharging is not as great as when the port 9, in which the resistance is much less, is used.

If an engine is fitted with a port 9, a valve as shown in Fig. 4 can be used to close it, if so desired, and make the operation the same as if the engine was not fitted with a port 9.

In either of these arrangements (port 9 not used) the valve 15 would have to be in operation at all times when the engine was running and could not, at any time, be held closed by means of hand wheel 17.

The engine can be operated under any of the above conditions with the inlet pipe 22 removed and there will then be no supercharging. If the valve is used either with or without the port 9, a slight increase of BHP will be obtained on account of the vacuum produced by the action of the piston in space 3 being less with the valve 15 than when the air is not admitted until the port 9 is opened at the end of the stroke.

This method of supercharging can be applied to the four cycle type of engine as well as to the two cycle. If an inlet pipe of proper dimensions is connected to the air inlet of the cylinder, the inertia of the air will act to supercharge the cylinder on the suction stroke of same as in the two cycle, provided the closing of the air intake valve has been adjusted late enough to give the air time enough to be forced in by its inertia before the valve closes.

I claim the following:

1. A supercharging organization for internal combustion engines adapted to deliver combustion-supporting air into the cylinder of such engine with a supercharging effect; said organization comprising in combination, an auxiliary chamber through which said air is caused to pass on its way to the combustion chamber of the engine cylinder, there being a valve-controlled and a piston-controlled non-regurgitational passage between said auxiliary chamber and said combustion chamber for such passage of air, and an air conduit through which said air is drawn into said auxiliary chamber and said cylinder by the action of the engine piston; said conduit being so proportioned as to cause the air passing therethrough to have a supercharging effect as it enters said chamber, as and for the purposes set forth.

2. A supercharging organization for internal combustion engines adapted to deliver combustion-supporting air into the cylinder of such engine at a supercharging velocity, said organization comprising in combination; an auxiliary chamber through which air is caused to pass to the engine cylinder, there being a communicating passage between said chamber and said cylinder for such passage of air; a check valve for said passage preventing regurgitation of transferred air, and an air conduit through which air is drawn by the action of the engine piston into said chamber; said conduit being so proportioned as to cause the air passing therethrough to have a supercharging effect as it enters said chamber, as and for the purposes set forth.

3. A supercharging organization for internal combustion engines adapted to deliver combustion-supporting air into the cylinder of such engines with a supercharging effect; said supercharging organization comprising in combination: an auxiliary chamber through which air is caused to pass to the engine cylinder through an intercommunicating passage provided for that purpose; a check valve for said passage arranged and adapted to be rendered operative or inoperative at will, and an air conduit through which air is drawn into said chamber by the action of the engine piston; said conduit being so proportioned as to cause the air passing therethrough to have a supercharging effect as it enters said chamber.

4. A supercharging organization for internal combustion engines of the three-port, valveless, two-stroke cycle type, adapted to deliver combustion-supporting air into the pump chamber of the cylinder of such engine so as to produce therein a supercharging effect; said organization comprising in combination, an auxiliary chamber, one wall of which is or may be the wall of said pump chamber, there being two communicating ports through said wall, one of which is the piston-controlled port of said pump chamber and the other a check valve-controlled port; a check valve for said last mentioned port adapted to prevent regurgitation of the air passing therethrough into said pump chamber, manually actuable means, actuable to render said check valve operative or inoperative at will, and an air conduit through which air is drawn into said chambers; said conduit being so proportioned as to cause the air passing therethrough to have a supercharging effect as it enters said chambers.

5. A supercharging organization for internal combustion engines of the three-port, valveless, two-stroke cycle type, said organization being adapted to deliver combustion-supporting air into the pump chamber of such engine so as to produce in said chamber a supercharging effect; said organization comprising in combination, an auxiliary chamber adjacent said pump chamber one wall of which is or may be the wall of said pump chamber, there being two communicating ports through said wall when so formed, one of which ports is the piston-controlled inlet port of said pump chamber and the other a check valve controlled port; a check valve for said last mentioned port adapted, when operative, to prevent the regurgitation of air through its port; manually actuable means adapted to render said check valve operative or inoperative at will, as specified; a closure element for said piston-controlled port, means operable at will whereby said closure element may be actuated into either a port-closing or a port-opening position, and an air conduit through which air is drawn into said chambers, said conduit being so proportioned with respect to the capacity of the instant engine, as to cause the air passing therethrough to have a supercharging effect as it enters said chambers.

EDGAR H. CROSSEN.